United States Patent [19]

Ziegler

[11] 4,093,304

[45] June 6, 1978

[54] HOLDING MEANS FOR A WINDOW, PREFERABLY WINDSHIELD IN VEHICLES

[75] Inventor: Hermann Ziegler, Renningen, Germany

[73] Assignee: Dr. Ing. h.c.F.Porsche Aktiengesellschaft, Germany

[21] Appl. No.: 684,022

[22] Filed: May 7, 1976

[30] Foreign Application Priority Data

May 7, 1976  Germany .............................. 2520320

[51] Int. Cl.² ................................................ B60J 1/02
[52] U.S. Cl. ...................................... 296/84 D; 52/403
[58] Field of Search ................ 296/84 R, 84 A, 84 D, 296/146; 52/400, 393, 397, 403

[56] References Cited

U.S. PATENT DOCUMENTS

| 2,610,713 | 9/1952 | Bradley ............................... 296/84 R |
| 2,610,714 | 9/1952 | Bradley .................................... 296/84 |
| 3,195,948 | 7/1965 | Sturtevant ............................. 296/146 |
| 3,245,182 | 4/1966 | Zierold .................................. 52/393 |
| 3,274,740 | 9/1966 | Hall ..................... 296/84 R |
| 3,742,649 | 7/1973 | Dochnahl ............................. 52/397 |
| 4,007,536 | 2/1977 | Soderberg ............................. 52/400 |

FOREIGN PATENT DOCUMENTS 2,336,375  7/1973  Germany .......................... 296/84 A Primary Examiner—Joseph F. Peters, Jr.
Assistant Examiner—John A. Carroll
Attorney, Agent, or Firm—Craig & Antonelli

[57] ABSTRACT

A windshield is attached to the windshield frame of an automobile by a generally U-shaped easily removable member which is clamped to a flange portion of the frame, and an adhesive material joining the windshield to the easily removable member. This facilitates removal of the windshield from the frame without the necessity of removing the adhesive material from between the frame and the windshield proper.

11 Claims, 5 Drawing Figures

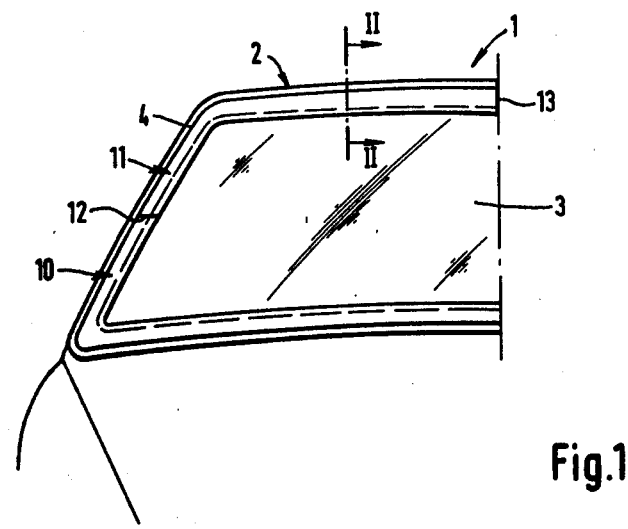
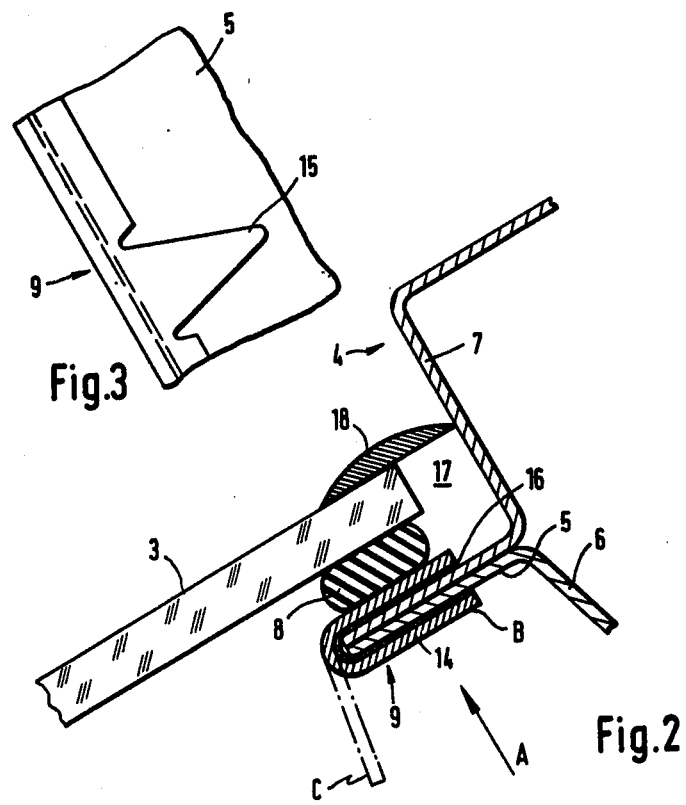

HOLDING MEANS FOR A WINDOW, PREFERABLY WINDSHIELD IN VEHICLES

FIELD OF THE INVENTION

The invention relates to a holding means for windows, preferably windshields in vehicles, especially motor vehicles with which the windshield (window pane) is held in position at a flange of a window frame by the use of an adhesive material.

DESCRIPTION OF THE PRIOR ART

It is known to fasten windshields directly to a flange of a windshield frame by the use of an adhesive material. This arrangement has the disadvantage, however, that costly measures are required for removal of these windshields, for example, when they show scratches after assembly during the series production, or for purposes of repair. For removal, it is necessary to separate the adhesive material from the flange of the windshield by a chiseling process which is not only time-consuming, but also the danger exists that the flange will be deformed thereby and subseqently can no longer be aligned in relation to the windshield. Therefore, it is an object of the present invention to provide a holding means for a windshield in such a manner that the described disadvantages are avoided.

BRIEF DESCRIPTION OF THE INVENTION

This problem is solved according to the invention by providing, between the adhesive material and flange, an easily removable member which makes removal of the windshield possible. In this connection, it is advantageous that the member be of U-shaped cross-section and that it encloses the window frame at least partially. The member consists preferably of metal and is provided along the circumference of the flange of the window frame. The member may be made of two frame sections. The element is provided, at the web facing the passenger compartment, with a trimming (turned-over edge). Part of the web may be selectively cut-out in such a manner that tongues are formed. The member is held on the flange through clamp-action. At least one web of the member is provided with a camber which cooperates with a corresponding camber at the flange. The web of the member, facing the window is provided with an extension which serves for the holding of a cover strip. The web between the windshield and flange is constructed so as to absorb energy. Finally, a sealing means is provided between the flange and the member.

The advantages gained with the invention can be seen especially therein, that the member may be easily lifted off so that the windshield can be removed in a simple manner. This is an advantage for mass-production, where faulty windows often have to be replaced, and for repairs where it is often necessary to remove the windshield. The U-shaped construction allows a problem-free manufacture as well as fastening of the member. If the member is assembled of at least two frame sections, the mounting is easy. The turned-over edge at the web, facing the passenger compartment, makes sure that for loosening the member, it can be gripped well, for example, by a bending device. If tongues are provided at the web and if their position is designated, loosening of the member can also be accomplished therewith. The holding of the member at the flange is accomplished either through clamping action or a camber.

BRIEF DESCRIPTION OF THE DRAWINGS

FIG. 1 shows a partial front view of a motor vehicle;

FIG. 2 shows a cross-section of an embodiment of the invention along line II—II of FIG. 1 on an enlarged scale;

FIG. 3 shows a partial view of FIG. 2 in the direction of arrow A;

Figure 4:
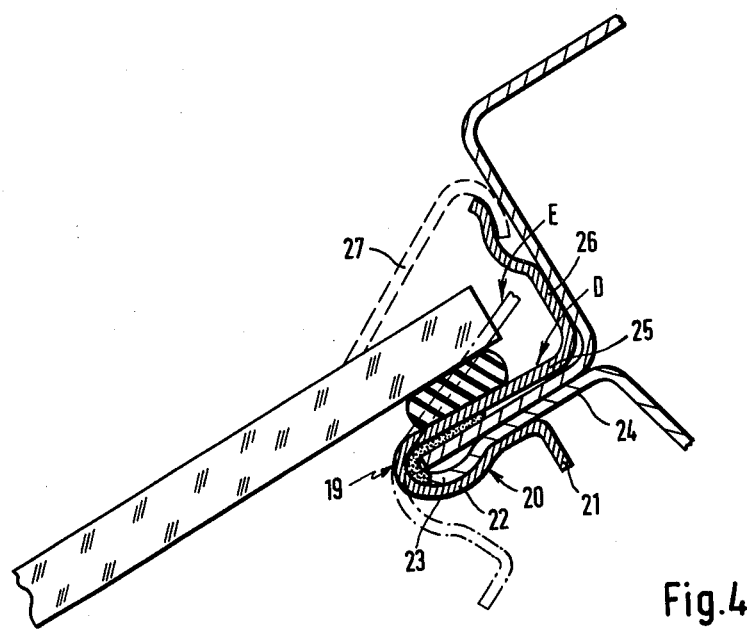
FIG. 4 shows a cross-sectional view of another embodiment of the invention.

A motor vehicle 1 is illustrated in FIG. 1 which comprises a body structure 2 including a windshield 3. For holding the windshield 3 in place, a windshield frame 4 is provided which has a flange 5 as shown in FIGS. 2 and 3. Flange 5 is formed of structural parts 6, 7. The windshield 3 is held in place by means of an adhesive material 8 whereby, between the adhesive material 8 and flange 5, a member 9 is provided which is arranged to be easily removable at the flange 5.

The member 9 consists of metal, preferably steel, is U-shaped in cross-section, and surrounds, at least partially, flange 5. It is placed around flange 5, embraces at least two frame sections 10, 11 which meet each other either at 12 or also at 13. If the windshield 3 is to be removed, the web 14 of member 9 facing the passenger compartment is bent from the position B to position C. Member 9 may also be made of a synthetic material such as Polyamid or ABS (Acrylnitril, Butadien, Styrol).

According to FIG. 3, the web 14 is cut out in such a manner that tongues 15 are created which extend along flange 5 and are easily bendable. The member 9, in its cross-section, is dimensioned such that it is held under clamp-action at the flange 5.

Semifluid material 16, such as Polymere synthetic material is provided between member 9 and the flange 5. Furthermore, the joint 17 between windshield 3 and windshield frame 4 is covered with an ornamental strip 18 glued to the windshield (glass).

According to the embodiment shown in FIG. 4, at web 20 of member 19 facing the passenger compartment, a turned-over edge 21 is provided through which member 19 can be easily gripped with a tool and bent into the dot and dashed position. A camber 22 is provided on web 20 which works together with another camber 23 of flange 24. By this means, a unintentional loosening of member 19 of flange 24 is resisted. Web 25 of member 20 which faces the windshield is constructed to be energy-absorbing, in that, it is moved from D to E during force action. Over and above, it is provided with an extension 26 which serves for the fastening of an ornamental strip 27 by the use of the clamp principle.

Figure 5:
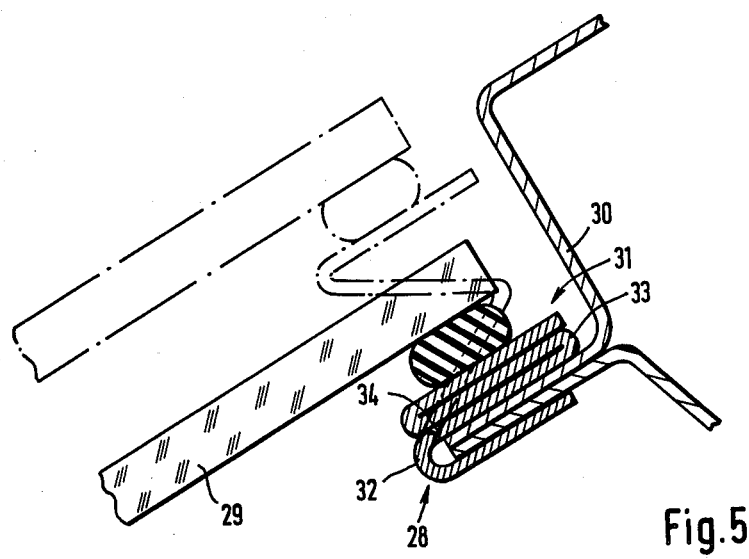
FIG. 5 shows a cross-sectional view of a further embodiment of the invention.

According to the embodiment shown in FIG. 5, a member 28 is provided with a web 31 between windshield glass 29 and windshield frame 30 which includes a number of positions 32, 33 which, during force action, for example, by body portions of the passengers, are bent upwardly during severe vehicle deceleration, so that the windshield 29 together with its fastening (holding) is constructed as a sub-backing system. In order that the positions 32, 33 bend in a definite manner, member 28 is provided with a cut-out at 34.

I claim:

1. In an arrangement for attaching a windshield to the windshield frame of an automobile by way of an adhesive material, the improvement comprising:

an easily removable member attached to said windshield frame, said adhesive joining said windshield to said easily removable member, wherein said easily removable member is at least in part U-shaped in cross-section and said windshield frame has a flange portion which is at least partially surrounded by said U-shaped part, and wherein part of said flange portion of said windshield frame is cambered and the adjoining part of said easily removable member is provided with a camber so as to be retained against the cambered part of said flange portion of said windshield frame.

2. The improvement according to claim 1, wherein said easily removable member is made of metal.

3. The improvement according to claim 1, wherein said windshield frame has a flange portion and said easily removable member extends around said flange portion.

4. The improvement according to claim 3, wherein said easily removable member is made up of a pair of member sections which join together to form a unitary easily removable member.

5. The improvement according to claim 3, wherein one end of said easily removable member has a portion shaped so as to facilitate removal of said member from said flange portion.

6. The improvement according to claim 1, wherein one end of said easily removable member is bent downwardly to project away from said flange portion of said windshield frame.

7. The improvement according to claim 1, wherein an edge of said easily removable member on one side of said flange portion of said windshield frame is provided with a tongue portion extending outwardly therefrom.

8. The improvement according to claim 1, wherein said easily removable member is so contoured as to be clamped on the flange portion of said windshield frame.

9. The improvement according to claim 1, further comprising a sealing material deposited between said flange portion of said windshield and said member.

10. The improvement according to claim 1, wherein one end of said easily removable member which faces the windshield is provided with an extension portion adjacent said windshield frame for receiving a cover strip and retaining said strip between said windshield and said windshield frame.

11. The improvement according to claim 10, wherein a sealing material is deposited between said flange portion of said windshield and said member.

* * * * *